(12) United States Patent
Moore et al.

(10) Patent No.: US 9,365,052 B1
(45) Date of Patent: Jun. 14, 2016

(54) SELF-ALIGNING CONVEYOR BELT HAVING MULTIPLE ZONES WITH DIFFERING FLEXIBLITY AND CROWNED ROLLER

(71) Applicant: Xerox Corporation, Norwalk, CT (US)

(72) Inventors: Aaron Michael Moore, Fairport, NY (US); Timothy Gordon Shelhart, West Henrietta, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/680,193

(22) Filed: Apr. 7, 2015

(51) Int. Cl.
*B65G 23/44* (2006.01)
*F16H 7/08* (2006.01)
*B41J 11/00* (2006.01)
*B65G 15/64* (2006.01)
*B65G 23/04* (2006.01)
*F26B 25/00* (2006.01)
*G03G 15/00* (2006.01)
*B65G 17/34* (2006.01)
*F16H 7/18* (2006.01)

(52) U.S. Cl.
CPC ............. *B41J 11/0015* (2013.01); *B65G 15/64* (2013.01); *B65G 17/345* (2013.01); *B65G 23/04* (2013.01); *F16H 7/18* (2013.01); *F26B 25/004* (2013.01); *G03G 15/755* (2013.01)

(58) Field of Classification Search
CPC ...... B65G 15/64; B65G 17/08; B65G 17/345; B65G 23/04; B65G 37/00; B65G 39/071; G03G 15/205; G03G 15/755; G03G 2215/2035; G11B 23/08778; F16H 7/18; F26B 25/004
See application file for complete search history.

(56) References Cited

U.S. PATENT DOCUMENTS

| | | | |
|---|---|---|---|
| 2,817,940 A | 12/1927 | Lorig | |
| 1,842,946 A | 1/1932 | Prins | |
| 2,686,590 A | 8/1954 | Sloane | |
| 2,822,169 A | 2/1958 | Lorig | |
| 3,161,125 A | 12/1964 | Hornbostel | |
| 3,772,931 A | 11/1973 | Conrad et al. | |
| 3,961,736 A | 6/1976 | Fatula | |
| 3,972,414 A | 8/1976 | Conrad | |
| 4,084,683 A | 4/1978 | Moss | |
| 4,140,216 A | 2/1979 | Conrad | |
| 4,170,175 A | 10/1979 | Conlon, Jr. | |
| 4,832,186 A * | 5/1989 | Conrad | B65G 39/16 198/806 |
| 4,986,413 A * | 1/1991 | Mraz | B65G 15/04 198/839 |

(Continued)

FOREIGN PATENT DOCUMENTS

EP 0334123 3/1989

*Primary Examiner* — Anh T. N. Vo
(74) *Attorney, Agent, or Firm* — Gibb & Riley, LLC

(57) ABSTRACT

Apparatuses include, among other components, a conveyor belt and at least one roller supporting the conveyor belt, etc. The belt moves in a processing direction as the roller rotates. The exterior surface of the roller has roller outer sections and a center crowned portion between the roller outer sections. The belt has belt outer sections and a belt center section between the belt outer sections. The belt outer sections contact the roller outer sections, and the belt center section contacts the center crowned portion of the roller. The belt outer sections have a lower flexibility, and the belt center section has a relatively higher flexibility. The flexibility difference between the higher flexibility and the lower flexibility biases the belt outer sections toward the center crowned portion of the roller and maintains the belt center section so that the belt center section is self-aligned with the center crowned portion of the roller.

20 Claims, 6 Drawing Sheets

(56) References Cited

U.S. PATENT DOCUMENTS

| | | |
|---|---|---|
| 5,178,221 A | 1/1993 | Hamawaki et al. |
| 5,194,050 A | 3/1993 | Muraishi et al. |
| 5,415,361 A | 5/1995 | Sato |
| 5,421,259 A | 6/1995 | Shiba et al. |
| 5,580,044 A | 12/1996 | Wafler |
| 5,940,254 A | 8/1999 | Clemons |
| 7,810,637 B2 * | 10/2010 | Gundlach ............ B65G 15/64 198/834 |
| 8,727,107 B2 | 5/2014 | Formicola et al. |
| 2011/0252656 A1 | 10/2011 | Moore et al. |

* cited by examiner

SELF-ALIGNING CONVEYOR BELT HAVING MULTIPLE ZONES WITH DIFFERING FLEXIBLITY AND CROWNED ROLLER

BACKGROUND

Devices herein generally relate to conveyor belts and more particularly to vacuum belts used to transport sheets of material.

Many devices that transport sheets of material utilize conveyor belts. One common conveyor belt utilized within print media transport devices (such as printers, finishing equipment, etc.) is a vacuum belt. Vacuum belts have openings, holes, or perforations through which a vacuum force is applied and such vacuum force maintains the sheet in good contact with the conveyor belt.

Conveyor belt tracking is a common issue that exists, especially in large printers as well as other belt-based conveying systems. Also, more tracking issues exist with relatively stiff belts, when compared with more flexible belts; however, flexible belts have limitations, such as durability in high-temperature environments, etc. More specifically, conveyor belts operate more efficiently and experience less wear when they are properly aligned with the rollers that drive and support the belt. Conveyor belts that are regularly out of alignment can damage the rollers, the motors driving the rollers, and/or the belts themselves, dramatically increasing cost, decreasing reliability, and correspondingly decreasing customer satisfaction.

SUMMARY

Exemplary apparatuses herein include, among other components, a conveyor belt and at least one roller supporting the conveyor belt, etc. The belt contacts the exterior of the roller(s). The belt moves in a processing direction as the roller rotates. The exterior surface of the roller has roller outer sections and a center crowned portion between the roller outer sections. The roller outer sections have a cylindrical shape. The center crowned portion of the roller has a larger diameter relative to the smaller diameter of the roller outer sections. The center crowned portion has a graded surface, and the center crowned portion is graded from the larger diameter of the largest diameter portion of the center crowned portion to the smaller diameter of the cylindrical roller outer sections.

The belt has belt outer sections and a belt center section between the belt outer sections. The belt outer sections contact the roller outer sections, and the belt center section contacts the center crowned portion of the roller.

The belt outer sections have a relatively lower flexibility, and the belt center section has a relatively higher flexibility, and such higher and lower flexibilities are flexibility measures in the processing direction. The flexibility difference between the higher flexibility and the lower flexibility biases the belt outer sections toward the center crowned portion of the roller and maintains the belt center section so that the belt center section is self-aligned with the center crowned portion of the roller. Thus, the lower flexibility of the belt outer sections prevents the belt outer sections from being positioned over the larger diameter of the center crowned portion.

Exemplary printing apparatuses herein include, among other components, a printing engine, a conveyor belt transporting media sheets from the printing engine, a heater adjacent the conveyor belt for drying the printed media sheets, at least one roller supporting the conveyor belt, etc. The belt contacts the exterior of the roller, and the belt moves in a processing direction as the roller rotates so as to transport the printed sheets output by the printing engine past the heater.

The exterior surface of the roller has roller outer sections and a center crowned portion between the roller outer sections. The roller outer sections have a cylindrical shape. The center crowned portion of the roller has a larger diameter relative to a smaller diameter of the roller outer sections. The center crowned portion has a graded surface, and the center crowned portion is graded from the largest diameter of the center crowned portion to the smaller diameter of the roller outer sections. The belt has belt outer sections and a belt center section between the belt outer sections. The belt outer sections contact the roller outer sections, and the belt center section contacts the center crowned portion of the roller.

The belt outer sections have a lower flexibility relative to the higher flexibility of the belt center section. The higher flexibility and the lower flexibility are flexibility measures in the processing direction. The flexibility difference between the higher flexibility and the lower flexibility biases the belt outer sections toward the center crowned portion of the roller and maintain the belt center section self-aligned with the center crowned portion of the roller. The lower flexibility of the belt outer sections prevent the belt outer sections from being positioned over the larger diameter of the center crowned portion.

These and other features are described in, or are apparent from, the following detailed description.

BRIEF DESCRIPTION OF THE DRAWINGS

Various exemplary devices are described in detail below, with reference to the attached drawing figures, in which.

DETAILED DESCRIPTION

As mentioned above, conveyor belt tracking is a common issue. While the angle of the rollers can be adjusted to maintain conveyor belt alignment over the rollers, the devices herein provide a more elegant solution that utilizes a crowned roller to maintain belt alignment. One issue with a crowned roller relates to the flexibility of the belt itself, because the stiffness of the bell may prevent the belt from properly conforming to the crown shape of the roller.

More specifically, the devices herein present a roller having a crown in the center portion of the roller. Also, the devices herein provide conveyor belts that have a relatively more flexible center (relative to the outer portions of belt), which permits the center portion of the belt to conform to the crown in the center of the roller. While the center portion of the belt conforms to the crown of the roller, the outer portions of the belts are much less flexible than the center portion of the belt; and the crown in the center of the roller biases the less flexible outer portions of the belt toward the crowned center of the roller, thereby self-centering the more rigid outer portions of doubt with respect to the crown of the roller. The width of the crown is approximately the same as (or equal to or less than) the width of the center portion of the belt, to continually keep the center portion of the belt centered on the center crown of the roller.

Conveyor belts are sometimes used in high-temperature situations. For example, vacuum conveyor belts used within printers may transport sheets of media that contain wet ink past dryer modules. Thus, some vacuum conveyor belts utilized within dryer portions of printers have difficulty withstanding high heat, particularly when paper covers only a portion of the belt width, resulting in non-uniform belt expansion across the belt width, which then lead to belt tracking issues.

Therefore, such vacuum conveyor belts should be able to withstand high temperatures, yet manufacturing belts for high-temperature use may make such belts very rigid and stiff. While rigid belts can withstand high heat, very rigid belts will not follow a crowned roll effectively. Active steering mechanisms that change the relative angles of the rollers can be used, but can be very expensive, and multiple belts may be used within devices, with each belt using a dedicated sensing and steering system to keep each belt tracking straight.

Figure 1:
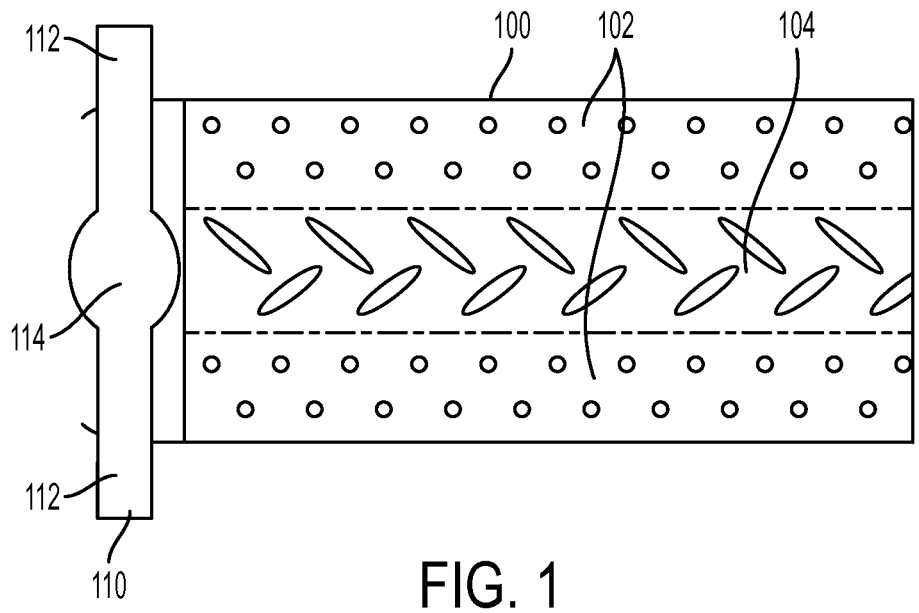
FIG. 1 is a schematic diagram illustrating devices herein.

Therefore, as shown for example in FIG. 1, the devices herein provide a rigid belt 100, split into multiple zones 102, 104. The outside zones 102 have a regular hole pattern of non-overlapping holes, while the middle zone(s) 104 use overlapping holes. The hole patterns makes the middle zone 104 less rigid relative to the outer zones 102.

The belt 100 is driven over a shaft 110 which has a center crowned portion 114 (e.g., hump, bump, bulge, a graded surface (having a larger diameter relative to the smaller diameter of the roller 110 outer sections), etc.) located at the center of the roller 110, where the center of the belt 100 (e.g., the middle belt 100 zone) can conform to the center crowned portion 114. The remainder of the shaft 110 comprises a non-graded cylindrical surface, which is sometimes referred to herein as the outer zones of the roller 112. If the belt 100 moves from being aligned with the center of the roller 110, one of the outer zones 102 is forced to stretch over the center crowned portion 114 of the roller 110, which biases the belt 100 toward the center crowned portion 114 of the roller 110.

Figure 2:
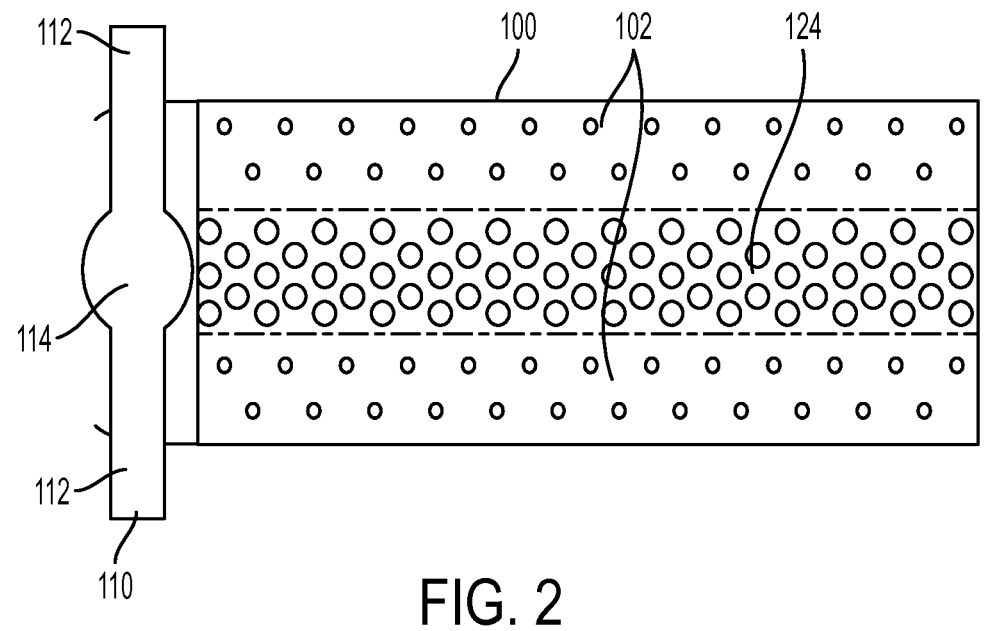
FIG. 2 is a schematic diagram illustrating devices herein.
Figure 3:
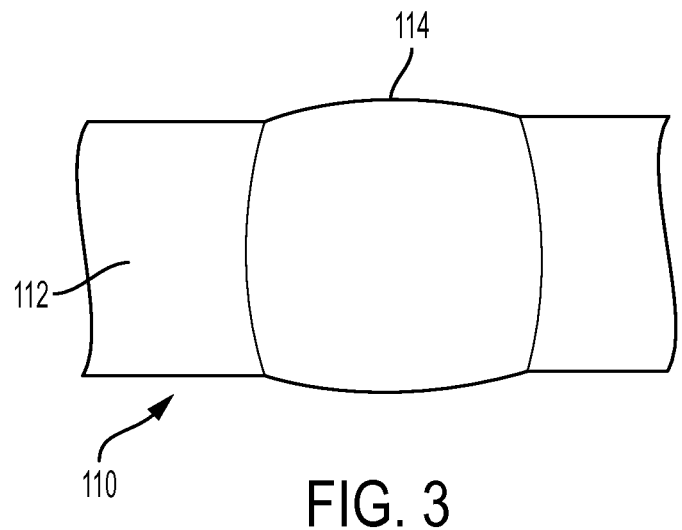
FIG. 3 is a schematic diagram illustrating devices herein.
Figure 4:
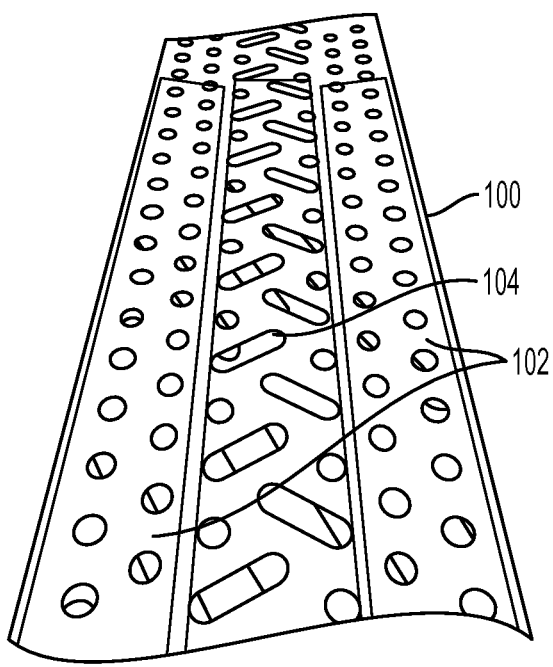
FIG. 4 is a schematic diagram illustrating devices herein.

FIG. 2 similar to FIG. 1, but includes a different overlapping pattern in the middle zone 124. FIG. 3 illustrates the roller 110, the cylindrical outer zones 112, and the center crowned portion 114 in greater detail. Similarly, figure for illustrates of the belt 100 in greater detail. As can be seen in FIG. 4, the holes within the middle zone 104 overlap one another, while the holes within the outer zones 102 of the belt 100 do not overlap one another. The overlapping holes within the middle zone 104 cut the fibers of the belt 100 that run in the length (processing direction), while the non-overlapping holes within the outer zones 102 do not cut through such fibers, which causes the middle zone 104 to be more flexible relative to the outer zones 102.

Therefore, the devices herein use a combination of a specific belt pattern in a rigid belt 100 running over a roller 110 having a crowned center portion 104. The belt 100 is formed of a relatively rigid material that does not stretch an appreciable amount under normal loads and has a pattern of holes over its entire length (e.g., vacuum belts 100). The belt 100 is divided into multiple zones along the belt width (the number of zones changes based on belt width).

The outer zones 102 retain rigid characteristics because the hole patterns do not include holes that overlap each other along the width of the belt 100. Because the holes do not overlap, the fibers that run the length of the belt 100 remain intact in several areas and the belt 100 remains rigid in the outer zones 102. The middle zone 104, however, has hole or slot patterns that overlap along the belt width, which reduces the rigidity of the belt 100 in the middle zone 104 by severing the fibers repeatedly along the width (and length) of the belt 100.

As noted above, the multi-zone belt 100 is used in combination with a crowned roller or shaft 110. The roller 110 comprises a straight cylinder 112 over the full length, except where the center 104 of the belt 100 contacts the roller 110. If multiple belts 100 are driven using a single roller 110, the roller 110 may include multiple center crowned portions 114. The width of the center crowned portion 114 is slightly narrower than the center zone 104 of the belt 100. The height of the center crowned portion 114 is generally large enough so that the outer belt zones 100 cannot stretch over the center crowned portion 114 when the belt 100 is tensioned.

In use, the belt 100 is positioned over the roller 110 and centered on the center crowned portion 114 of the roller 110, and a tensioner is engaged to tightly suspend the belt 100 between at least two opposing rollers 110. The outer zones 102 of the belt 100 ride smoothly on the cylindrical outer portions 112 of the roller 110, while the center zone 104 of the belt 100 conforms over the graded surface of the center crowned portion 114 of the roller 110. As the center 104 of the belt 100 tends to stray from the center of the center crowned portion 114 of the roller 110, the more rigid outer zones 102 of the belt 100 come into contact with, and are driven against, the center crowned portion 114 of the roller 110. However, since the outer zones 102 of the belt 100 are rigid, the outer zones 102 of the belt 100 will be biased against climbing the graded surface of the center crowned portion 114 of the roller 110 and the belt 100 therefore is biased to remain centered on the center crowned portion 114 of the roller 110.

Thus, as shown above, different patterns of holes are formed in a rigid belt to create multiple zones, to emulate the functionality of a more flexible belt, with the heat-resistant nature of a rigid belt. The outside zones 102 of the belt 100 receive a non-overlapping hole pattern, while the middle zone 104 of the belt 100 includes overlapping holes, which make the middle zone of the belt 100 more flexible than the outer zones 102 of the belt 100. Thus, the hole patterns make the middle zone 104 flexible, while the outer zones 102 retain their rigidity. The belt 100 is driven over a shaft 110 that has a center crowned portion 114, and the middle zone of the belt 100 is positioned to contact the center crowned portion 114 of the roller 110, which allows the middle zone 104 to conform to the center crowned portion 114 of the roller 110. If the belt 100 moves from being centered over the center crowned portion 114 of the roller 110, one of the outer zones 102 is forced to stretch over the center crowned portion 114 of the roller 110, but because the outer zones 102 of the belt 100 are rigid, the outer zones 102 cannot deform sufficiently to accommodate the center crowned portion 114 of the roller 110, which biases the belt 100 so that it remains self-centered over the center crowned portion 114 of the roller 110.

Figure 5:
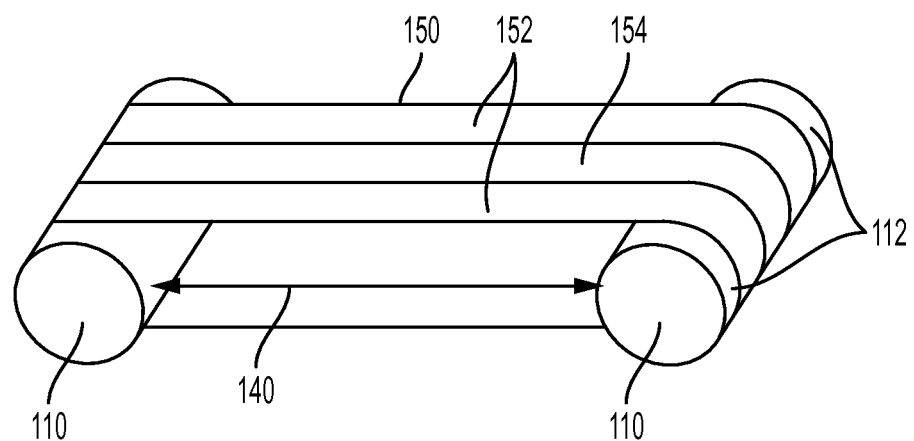
FIG. 5 is a schematic diagram illustrating devices herein.
Figure 6:
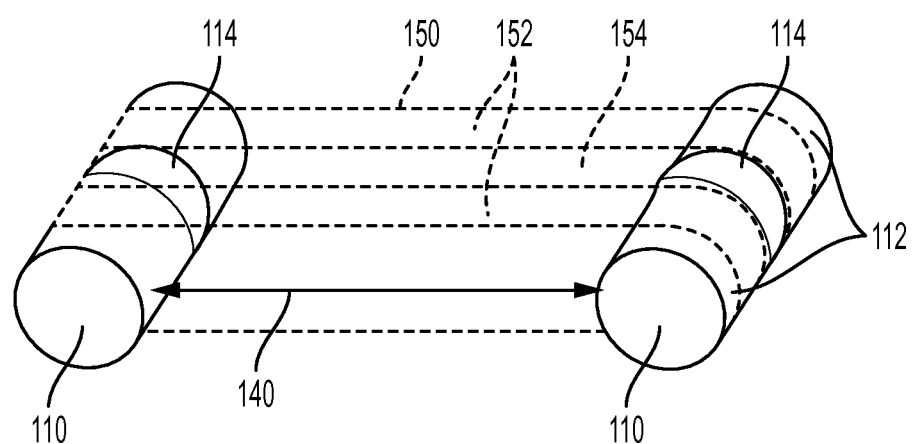
FIG. 6 is a schematic diagram illustrating devices herein.

While the foregoing structures are disclosed as including different hole patterns in the middle and outer zones of the belt, other structures herein can utilize a belt that does not include any hole patterns, or that can include a regular hole pattern along the entire belt (the regular hole pattern is not shown to avoid clutter in the drawings). Such a structure is shown in FIGS. 5 and 6, where FIG. 5 illustrates the belt 150 in non-transparent form, and FIG. 6 illustrates the same belt 150 in transparent form. Showing the belt 150 in FIG. 6 in transparent form allows the center crowned portion 114 of the roller 112 to be more easily viewed. In addition, FIGS. 5 and 6 include a tensioning mechanism 140 which can comprise a frame, spring, biasing member, gas strut, etc., used to bias the rollers 110 away from one another after the belt 150 is mounted on the rollers 110.

As shown in FIGS. 5 and 6, the belt 150 includes a relatively more flexible middle zone 154 and relatively less flexible outer zones 152. The outer zones 152 and middle zone 154 can be made of different materials that have different flexibilities. Alternatively, the outer zones 152 and middle zone 154 can be made of the same material that has a different thickness, and the reduced thickness of the middle zone 154 provides the middle zone 154 with greater flexibility relative to the outer zones 152.

Figure 7:
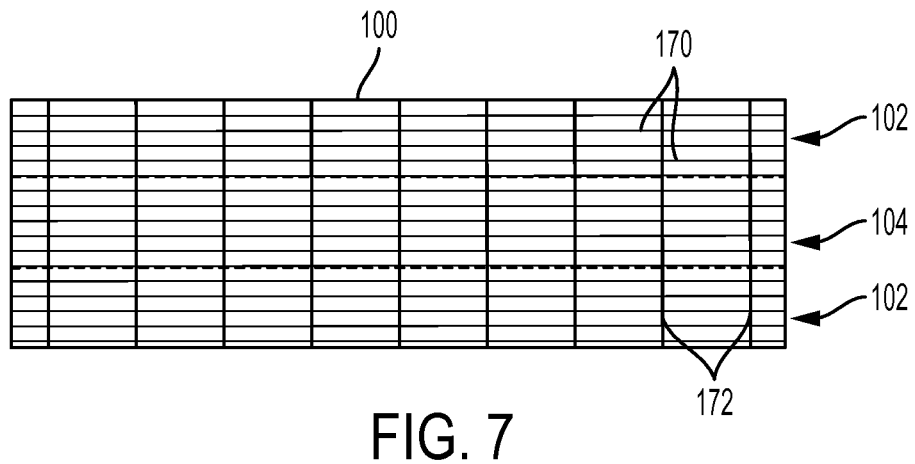
FIG. 7 is a schematic diagram illustrating devices herein.
Figure 8:
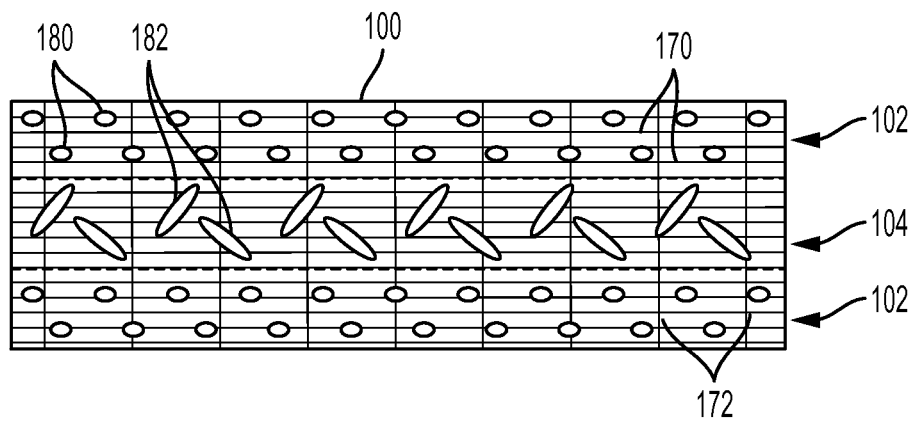
FIG. 8 is a schematic diagram illustrating devices herein.

FIGS. 7 and 8 illustrate some exemplary ways in which the belt 100 shown in FIG. 1 can be manufactured. More specifically, FIG. 7 shows strengthening fibers 170 running along the length of the belt (in the processing direction) and strengthening fibers 172 running across the width of the belt in the cross-processing direction. These fibers can be of any strengthening material, such as fiberglass, metals, alloys, polymers, etc., and the remaining surface of the belt can be a softer more flexible material, such as plastics, rubbers, etc.

As shown in FIG. 8, various hole patterns 180, 182 are formed through the belt 100 using any commonly known manufacturing process including manual cutting (e.g., using hand or power tools); automated cutting (e.g., using saws, laser cutters, water cutters, etc.); presses, or the belt 100 can be output through dies that produce such whole patterns come, etc.

As also shown in FIG. 8, the hole patterns 180 avoid cutting through all of the longitudinal fibers 170 and horizontal fibers 172. To the contrary, the increased size and overlapping nature of the overlapping hole pattern 182 cuts through most or all of the longitudinal fibers 170 and horizontal fibers 172, which substantially weakens the structure of the middle zone 104 of the belt 100. Therefore, the overlapping hole pattern 182 makes the middle zone 104 of the belt 100 more flexible relative to the outer zones 102 of the belt 100.

Figure 9:
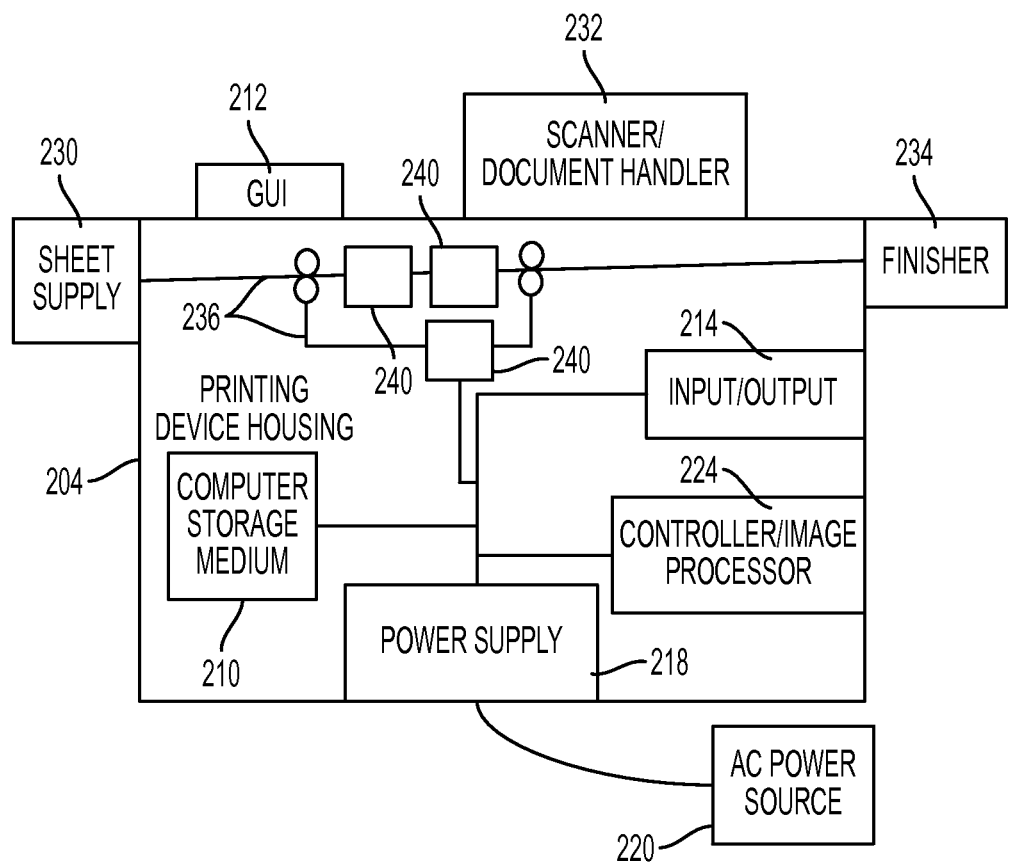
FIG. 9 is a schematic diagram illustrating devices herein.

FIG. 9 illustrates a computerized device that is a printing device 204, which can be used with devices herein and can comprise, for example, a printer, copier, multi-function machine, multi-function device (MFD), etc. Thus, FIG. 9 illustrates a printing device 204, which can be used with devices herein and can comprise, for example, a print server, a personal computer, a portable computing device, etc. The printing device 204 includes a controller/tangible processor 216 and a communications port (input/output) 214 operatively connected to the tangible processor 216 and to the computerized network 202 external to the printing device 204. Also, the printing device 204 can include at least one accessory functional component, such as a graphical user interface (GUI) assembly 212. The user may receive messages, instructions, and menu options from, and enter instructions through, the graphical user interface or control panel 212.

The input/output device 214 is used for communications to and from the printing device 204 and comprises a wired device or wireless device (of any form, whether currently known or developed in the future). The tangible processor 216 controls the various actions of the computerized device. A non-transitory, tangible, computer storage medium device 210 (which can be optical, magnetic, capacitor based, etc., and is different from a transitory signal) is readable by the tangible processor 216 and stores instructions that the tangible processor 216 executes to allow the computerized device to perform its various functions, such as those described herein. Thus, as shown in FIG. 9, a body housing has one or more functional components that operate on power supplied from an alternating current (AC) source 220 by the power supply 218. The power supply 218 can comprise a common power conversion unit, power storage element (e.g., a battery, etc), etc.

The printing device 204 includes many of the components mentioned above and at least one marking device (printing engine(s)) 240 operatively connected to a specialized image processor 224 (that is different than a general purpose computer because it is specialized for processing image data), a media path 236 positioned to supply continuous media or sheets of media from a sheet supply 230 to the marking device(s) 240, etc. Portions of this media path 236 utilize the various belts and rollers that are discussed above and shown in FIGS. 1-8. After receiving various markings from the printing engine(s) 240, the sheets of media can optionally pass to a finisher 234 which can fold, staple, sort, etc., the various printed sheets. Also, the printing device 204 can include at least one accessory functional component (such as a scanner/document handler 232 (automatic document feeder (ADF)), etc.) that also operate on the power supplied from the external power source 220 (through the power supply 218).

Figure 10:
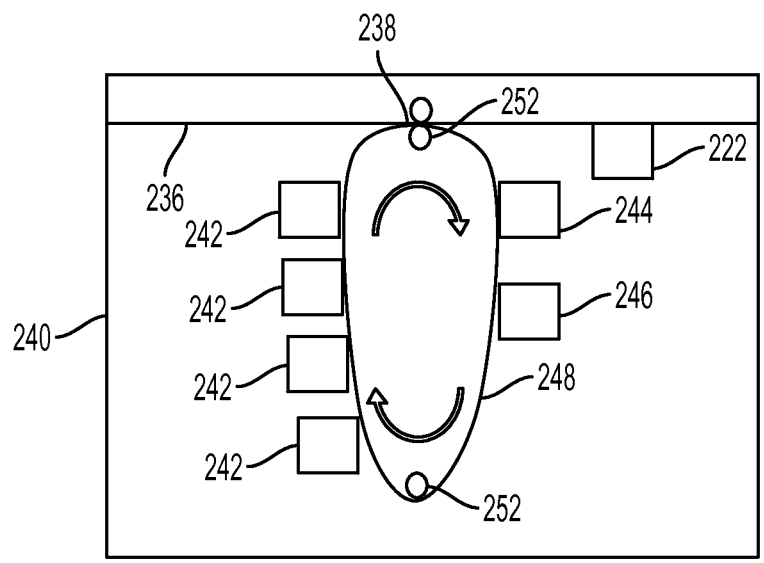
FIG. 10 is a schematic diagram illustrating devices herein.
Figure 11:
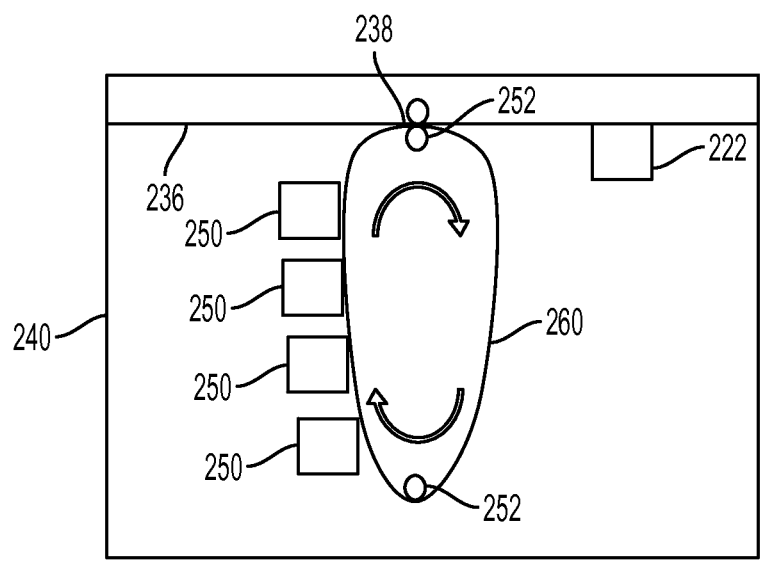
FIG. 11 is a schematic diagram illustrating devices herein.

The one or more printing engines 240 are intended to illustrate any marking device that applies a marking material (toner, inks, etc.) to continuous media or sheets of media, whether currently known or developed in the future and can include, for example, devices that use a photoreceptor belt 248 (as shown in FIG. 10) or an intermediate transfer belt 260 (as shown in FIG. 11), or devices that print directly to print media (e.g., inkjet printers, ribbon-based contact printers, etc.).

More specifically, FIG. 10 illustrates one example of the above-mentioned printing engine(s) 240 that uses one or more (potentially different color) development stations 242 adjacent a photoreceptor belt 248 supported on rollers 252. Thus, in FIG. 10 an electronic or optical image or an image of an original document or set of documents to be reproduced may be projected or scanned onto a charged surface of the photoreceptor belt 248 using an imaging device (sometimes called a raster output scanner (ROS)) 246 to form an electrostatic latent image. Thus, the electrostatic image can be formed onto the photoreceptor belt 248 using a blanket charging station/device 244 (and item 244 can include a cleaning station or a separate cleaning station can be used) and the imaging station/device 246 (such as an optical projection device, e.g., raster output scanner). Thus, the imaging station/device 246 changes a uniform charge created on the photoreceptor belt 248 by the blanket charging station/device 244 to a patterned charge through light exposure, for example.

The photoreceptor belt 248 is driven (using, for example, driven rollers 252) to move the photoreceptor in the direction indicated by the arrows past the development stations 242, and a transfer station 238. Note that devices herein can include a single development station 242, or can include multiple development stations 242, each of which provides marking material (e.g., charged toner) that is attracted by the patterned charge on the photoreceptor belt 248. The same location on the photoreceptor belt 248 is rotated past the imaging station 246 multiple times to allow different charge patterns to be presented to different development stations 242, and thereby successively apply different patterns of different colors to the same location on the photoreceptor belt 248 to form a multi-color image of marking material (e.g., toner) which is then transferred to print media at the transfer station 238.

As is understood by those ordinarily skilled in the art, the transfer station 238 generally includes rollers and other transfer devices. Further, item 222 represents a fuser device that is generally known by those ordinarily skilled in the art to include heating devices and/or rollers that fuse or dry the marking material to permanently bond the marking material to the print media.

Thus, in the example shown in FIG. 10, which contains four different color development stations 242, the photoreceptor belt 248 is rotated through four revolutions in order to allow each of the development stations 242 to transfer a different color marking material (where each of the development stations 242 transfers marking material to the photoreceptor belt 248 during a different revolution). After all such revolutions, four different colors have been transferred to the same location of the photoreceptor belt, thereby forming a complete multi-color image on the photoreceptor belt, after which the complete multi-color image is transferred to print media, traveling along the media path 236, at the transfer station 238.

Alternatively, printing engine(s) 240 shown in FIG. 9 can utilize one or more potentially different color marking stations 250 and an intermediate transfer belt (ITB) 260 supported on rollers 252, as shown in FIG. 11. The marking stations 250 can be any form of marking station, whether currently known or developed in the future, such as individual electrostatic marking stations, individual inkjet stations, individual dry ink stations, etc. Each of the marking stations 250 transfers a pattern of marking material to the same location of the intermediate transfer belt 260 in sequence during a single belt rotation (potentially independently of a condition of the intermediate transfer belt 260) thereby, reducing the number of passes the intermediate transfer belt 260 makes before a full and complete image is transferred to the intermediate transfer belt 260.

While FIGS. 10 and 11 illustrate four marking stations 242, 250 adjacent or in contact with a rotating belt (248, 260), which is useful with systems that mark in four different colors such as, red, green, blue (RGB), and black; or cyan, magenta, yellow, and black (CMYK), as would be understood by those ordinarily skilled in the art, such devices could use a single marking station (e.g., black) or could use any number of marking stations (e.g., 2, 3, 5, 8, 11, etc.).

Thus, in printing devices herein a latent image can be developed with developing material to form a toner image corresponding to the latent image. Then, a sheet is fed from a selected paper tray supply to a sheet transport for travel to a transfer station. There, the image is transferred to a print media material, to which it may be permanently fixed by a fusing device. The print media is then transported by the sheet output transport 236 to output trays or a multi-function finishing station 234 performing different actions, such as stapling, hole-punching and C or Z-folding, a modular booklet maker, etc., although those ordinarily skilled in the art would understand that the finisher/output tray 234 could comprise any functional unit.

Thus, as shown in FIGS. 1-11, exemplary printing apparatuses herein include, among other components, a printing engine 240, a conveyor belt 100 transporting media sheets from the printing engine 240, a heater 222 adjacent the conveyor belt 100 for drying the printed media sheets, at least one roller 110 supporting the conveyor belt 100, etc. The belt 100 contacts the exterior of the roller 110, and the belt 100 moves in a processing direction as the roller 110 rotates so as to transport the printed sheets output by the printing engine 240 past the heater 222.

The exterior surface of the roller 110 has roller outer sections 112 and a center crowned portion 114 between the roller 110 outer sections. The roller outer sections 112 have a cylindrical shape. The center crowned portion 114 of the roller 110 has a larger diameter relative to a smaller diameter of the roller 110 outer sections 112. The center crowned portion 114 has a graded surface, and the center crowned portion 114 is graded from the largest diameter of the center crowned portion 114 to the smaller diameter of the roller 110 outer sections. The belt 100 has belt outer sections 102 and a belt center section 104 between the belt outer sections 102. The belt outer sections 102 contact the roller outer sections 112, and the belt center section 104 contacts the center crowned portion 114 of the roller 110.

The belt outer sections 102 have a lower flexibility relative to the higher flexibility of the belt center section 104. The higher flexibility and the lower flexibility are flexibility measures in the processing direction. The flexibility difference between the higher flexibility and the lower flexibility biases the belt outer sections 102 toward the center crowned portion 114 of the roller 110 and maintain the belt center section 104 self-aligned with the center crowned portion 114 of the roller 110. The lower flexibility of the belt outer sections 102 prevents the belt outer sections 102 from being positioned over the larger diameter of the center crowned portion 114.

For ease of terminology, when the belt 100 is moved by the rollers 110, it is considered to move in a "processing direction," and that processing direction runs along the "length" of the belt 100. Correspondingly, the "width" of the belt 100 is perpendicular to the processing direction, and the width of the belt 100 is perpendicular to the length of the belt 100. To use consistent terminology, the "width" of the roller 110 is parallel to the width of the belt 100 (as they are both considered to be in the cross-process direction). Similarly, the "width" of the outer sections 112 and the "width" of the center crowned portion 114 of the roller 110 are also positioned in the cross-processing direction and are similarly perpendicular to the length of the belt 100. To be consistent, the "width" of the belt outer sections 102 and the belt center section 104 are also positioned in the cross-processing direction and are similarly perpendicular to the length of the belt 100. As noted above, the width of the center crowned portion 114 is approximately the same as the width of the belt center section 104, to continually keep the belt center section 104 centered on the center crowned portion 114 of the roller 110.

If the belt outer sections 102 are constantly forced against the center crowned portion 114 of the roller 110, this can cause excessive flexing of the belt outer sections 102, which can increase wear on the belt 100. To reduce wear on the belt 100, the width of the center crowned portion 114 can be made slightly smaller than the width of the belt center section 104; however, the closer that the width of the center crowned portion 114 is to the width of the belt center section 104, the more centered the belt will remain. Therefore, the size match between the width of the center crowned portion 114 and the width of the belt center section 104 will depend upon system tolerances and how centered the belt 100 is to remain on the center crowned portion 114.

As would be understood by those ordinarily skilled in the art, the printing device 204 shown in FIG. 9 is only one example and the devices herein are equally applicable to other types of printing devices that may include fewer components or more components. For example, while a limited number of printing engines and paper paths are illustrated in FIG. 9, those ordinarily skilled in the art would understand that many more paper paths and additional printing engines could be included within any printing device used with devices herein. The same items in the drawings are identified with the same identification numerals.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the devices described herein. Similarly, printers, copiers, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The devices herein can encompass devices that print in color, monochrome, or handle color or monochrome image data. All foregoing devices are specifically applicable to electrostatographic and/or xerographic machines and/or processes.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the devices herein cannot be implied or imported from any above example as limitations to any particular order, number, position, size, shape, angle, color, or material.

What is claimed is:

1. An apparatus comprising:
   a conveyor belt; and
   a roller supporting said conveyor belt,
   said belt contacting an exterior surface of said roller,
   said belt moving in a processing direction as said roller rotates,
   said exterior surface of said roller having roller outer sections and a center crowned portion between said roller outer sections,
   said center crowned portion of said roller having a larger diameter relative to a smaller diameter of said roller outer sections,
   said belt having belt outer sections and a belt center section between said belt outer sections,
   said belt outer sections contacting said roller outer sections,
   said belt center section contacting said center crowned portion of said roller,
   said belt outer sections having a lower flexibility,
   said belt center section having a higher flexibility relative to said lower flexibility, and
   a flexibility difference between said higher flexibility and said lower flexibility biasing said belt outer sections toward said center crowned portion of said roller and maintaining said belt center section self-aligned with said center crowned portion of said roller.

2. The apparatus according to claim 1, said lower flexibility of said belt outer sections preventing said belt outer sections from being positioned over said larger diameter of said center crowned portion.

3. The apparatus according to claim 1, said center crowned portion having a graded surface, and said center crowned portion being graded from said larger diameter to said smaller diameter of said roller outer sections.

4. The apparatus according to claim 1, said higher flexibility and said lower flexibility being flexibility measures in said processing direction.

5. The apparatus according to claim 1, said roller outer sections having a cylindrical shape.

6. An apparatus comprising:
   a conveyor belt having perforations; and
   a roller supporting said conveyor belt,
   said belt contacting an exterior surface of said roller,
   said belt moving in a processing direction as said roller rotates,
   said exterior surface of said roller having roller outer sections and a center crowned portion between said roller outer sections,
   said center crowned portion of said roller having a larger diameter relative to a smaller diameter of said roller outer sections,
   said belt having belt outer sections and a belt center section between said belt outer sections,
   said belt outer sections contacting said roller outer sections,
   said belt center section contacting said center crowned portion of said roller,
   said belt outer sections having a first pattern of holes,
   said first pattern of holes producing a lower flexibility in said belt outer sections,
   said belt center section having a second pattern of holes,
   said second pattern of holes producing a higher flexibility in said belt center section relative to said lower flexibility, and
   a flexibility difference between said higher flexibility and said lower flexibility biasing said belt outer sections toward said center crowned portion of said roller and maintaining said belt center section self-aligned with said center crowned portion of said roller.

7. The apparatus according to claim 6, said lower flexibility of said belt outer sections preventing said belt outer sections from being positioned over said larger diameter of said center crowned portion.

8. The apparatus according to claim 6, said center crowned portion having a graded surface, and said center crowned portion being graded from said larger diameter to said smaller diameter of said roller outer sections.

9. The apparatus according to claim 6, said higher flexibility and said lower flexibility being flexibility measures in said processing direction.

10. The apparatus according to claim 6, said roller outer sections having a cylindrical shape.

11. A sheet drying apparatus comprising:
a heater;
a conveyor belt adjacent said heater; and
a roller supporting said conveyor belt,
said belt contacting an exterior surface of said roller,
said belt moving in a processing direction past said heater as said roller rotates,
said exterior surface of said roller having roller outer sections and a center crowned portion between said roller outer sections,
said center crowned portion of said roller having a larger diameter relative to a smaller diameter of said roller outer sections,
said belt having belt outer sections and a belt center section between said belt outer sections,
said belt outer sections contacting said roller outer sections,
said belt center section contacting said center crowned portion of said roller,
said belt outer sections having a lower flexibility,
said belt center section having a higher flexibility relative to said lower flexibility, and
a flexibility difference between said higher flexibility and said lower flexibility biasing said belt outer sections toward said center crowned portion of said roller and maintaining said belt center section self-aligned with said center crowned portion of said roller.

12. The sheet drying apparatus according to claim 11, said lower flexibility of said belt outer sections preventing said belt outer sections from being positioned over said larger diameter of said center crowned portion.

13. The sheet drying apparatus according to claim 11, said center crowned portion having a graded surface, and said center crowned portion being graded from said larger diameter to said smaller diameter of said roller outer sections.

14. The sheet drying apparatus according to claim 11, said higher flexibility and said lower flexibility being flexibility measures in said processing direction.

15. The sheet drying apparatus according to claim 11, said roller outer sections having a cylindrical shape.

16. A printing apparatus comprising:
a printing engine;
a conveyor belt transporting sheets from said printing engine;
a heater adjacent said conveyor belt; and
a roller supporting said conveyor belt,
said belt contacting an exterior surface of said roller,
said belt moving in a processing direction as said roller rotates and transporting printed sheets output by said printing engine past said heater,
said exterior surface of said roller having roller outer sections and a center crowned portion between said roller outer sections,
said center crowned portion of said roller having a larger diameter relative to a smaller diameter of said roller outer sections,
said belt having belt outer sections and a belt center section between said belt outer sections,
said belt outer sections contacting said roller outer sections,
said belt center section contacting said center crowned portion of said roller,
said belt outer sections having a lower flexibility,
said belt center section having a higher flexibility relative to said lower flexibility, and
a flexibility difference between said higher flexibility and said lower flexibility biasing said belt outer sections toward said center crowned portion of said roller and maintaining said belt center section self-aligned with said center crowned portion of said roller.

17. The printing apparatus according to claim 16, said lower flexibility of said belt outer sections preventing said belt outer sections from being positioned over said larger diameter of said center crowned portion.

18. The printing apparatus according to claim 16, said center crowned portion having a graded surface, and said center crowned portion being graded from said larger diameter to said smaller diameter of said roller outer sections.

19. The printing apparatus according to claim 16, said higher flexibility and said lower flexibility being flexibility measures in said processing direction.

20. The printing apparatus according to claim 16, said roller outer sections having a cylindrical shape.

\* \* \* \* \*